United States Patent [19]

Cassidy et al.

[11] Patent Number: 5,337,345
[45] Date of Patent: Aug. 9, 1994

[54] SYSTEM FOR SECURING MOBILE TELEPHONES FROM UNAUTHORIZED TRANSMISSION

[75] Inventors: Barrie Cassidy; David McNab; James Rooney, all of Calgary, Canada

[73] Assignee: NovAtel Communications, Calgary, Canada

[21] Appl. No.: 921,557

[22] Filed: Jul. 29, 1992

[51] Int. Cl.⁵ .................. H04M 11/00; H04Q 7/00; H04B 1/00; H04B 1/34
[52] U.S. Cl. .................................. 379/58; 379/59; 379/62; 379/63; 379/95; 379/96; 455/33.1; 455/54.2; 455/89; 455/95
[58] Field of Search ............... 379/58, 59, 62, 63, 379/96, 95; 455/33.1, 54.2, 89, 95

[56] References Cited

U.S. PATENT DOCUMENTS

| | | | |
|---|---|---|---|
| 4,677,653 | 6/1987 | Weiner et al. | 379/59 |
| 4,697,260 | 9/1987 | Grauel et al. | 379/59 |
| 4,697,281 | 9/1987 | O'Sullivan | 455/33 |
| 4,823,362 | 4/1989 | Etoh | 379/59 |
| 4,965,820 | 10/1990 | Sharpe et al. | 379/59 |
| 4,972,506 | 11/1990 | Uddenfeldt | 455/54 |
| 5,020,091 | 5/1991 | Krolopp et al. | 379/58 |
| 5,031,204 | 7/1991 | McKernan | 379/63 |
| 5,046,187 | 9/1991 | Takahashi | 379/59 |
| 5,128,959 | 7/1992 | Bruckert | 379/59 |

Primary Examiner—Stephen Chin
Assistant Examiner—Vijay Shankar
Attorney, Agent, or Firm—Cesari and McKenna

[57] ABSTRACT

A mobile telephone incorporating the invention includes in its transmitter circuitry a system for preventing unauthorized calls from being transmitted by the telephone. The system ensures that the telephone transmit only service and call requests that include the electronic serial number ("ESN") which is permanently stored in the telephone by the manufacturer, in an unalterable ESN memory. The system in one embodiment includes ESN detection circuitry which determines the bit position of an ESN in a service or call request and either compares the ESN in the request with the ESN stored in the ESN memory and transmit only requests that contain matching ESNs, or substitutes the ESN from the ESN memory directly into the requests as they are being transmitted. In an alternative embodiment, the system formats the requests using the ESN from the ESN memory and message information supplied to it by the user. The system, which is otherwise inaccessible to user-supplied information, then transmits the formatted requests.

10 Claims, 10 Drawing Sheets

FIRST WORD - Abbreviated Address Word

SECOND WORD - Extended Address Word

THIRD WORD - Serial Number Word

FOURTH WORD - First Word of the Called Address

FIFTH WORD - Second Word of the Called Address

SYSTEM FOR SECURING MOBILE TELEPHONES FROM UNAUTHORIZED TRANSMISSION

FIELD OF INVENTION

The invention relates generally to mobile telephones and more particularly to a mechanism to secure mobile telephones from unauthorized transmissions.

BACKGROUND

When a user of a mobile telephone requests service, for example, places a call, the telephone transmits, as part of a service or call request, a pair of identification numbers. One of the numbers is a mobile telephone number and the other number uniquely identifies the telephone itself. A base station receiving the call request examines the two numbers. If it recognizes the numbers as a valid pair, which indicates that the identified telephone is authorized to use the mobile telephone number, the base station processes the call. The base station then charges the call to the identified telephone.

The mobile telephone number, which is assigned to the telephone by the applicable telephone company, is commonly referred to as a "mobile identification number" or "MIN." The number which uniquely identifies the telephone is an electronic serial number or "ESN," which is assigned to the telephone by the manufacturer. If a caller knows the ESN assigned to a particular telephone and the MIN for which the telephone is authorized, the caller may include these numbers in a call request originating from a different telephone, and thus, make an unauthorized call. A base station receiving the requests checks the included numbers and processes the "unauthorized" call. The base station then bills the call to the telephone identified in the call request. Accordingly, what is needed is a mechanism to prevent the alteration of information which identifies the originator of a call, or other service, request.

Each ESN is unique and assigned to a telephone by the manufacturer. The manufacturer places in the telephone a one-time programmable ESN memory which contains the assigned ESN. Accordingly, the ESN cannot be altered by the user. The MIN is assigned to the telephone by the telephone company. The MIN is stored in the telephone in a read-write memory which may be altered by a user, as necessary, to accommodate new MIN's.

When a user requires service, for example, when he desires to make a call, a request processor in the telephone formulates a call request by organizing the requisite information in the form of a series of words, retrieving the ESN and MIN from the respective memories and including these numbers in the appropriate words. The call request is then encoded for transmission and transmitted to the base station by a data transmitter. If a person desires to make an unauthorized call, that is, change the ESN-MIN combination for a particular call, the caller can easily change the stored MIN to the desired MIN. However, the caller can not change the ESN stored in the manufacturer-installed ESN memory. Accordingly, the caller might somehow instruct the request processor to insert in the call request an ESN stored in a different memory. The processor then inserts in the call request the ESN to which it is directed and formats and transmits the request as if the request contains the MIN and ESN assigned to the telephone. What is needed is a mechanism which assures that the manufacturer-assigned ESN is included in a call request.

SUMMARY

A mobile telephone incorporating the invention includes in its transmitter circuitry a circuit or sub-system which ensures that the ESN assigned to the telephone is the ESN transmitted in a service, or call request. In one embodiment, the data transmitter includes ESN detection circuitry which determines the bit position of an ESN in a call request and either (i) compares the ESN in the call request with the assigned ESN stored in the telephone and transmits only requests which contain the appropriate ESN, or (ii) directly places the assigned ESN in each call request as the request is being transmitted.

In another embodiment, the ESN memory is included in the transmitter as is "request-formatting" circuitry. The transmitter formatting circuitry formats a request using the internal ESN and message information supplied to it by, for example, a user, and transmits the request.

DESCRIPTION OF THE DRAWINGS

The above and further advantages of the invention may be better understood by referring to the following description in conjunction with the accompanying drawings, in which.

DETAILED DESCRIPTION

Figure 1:
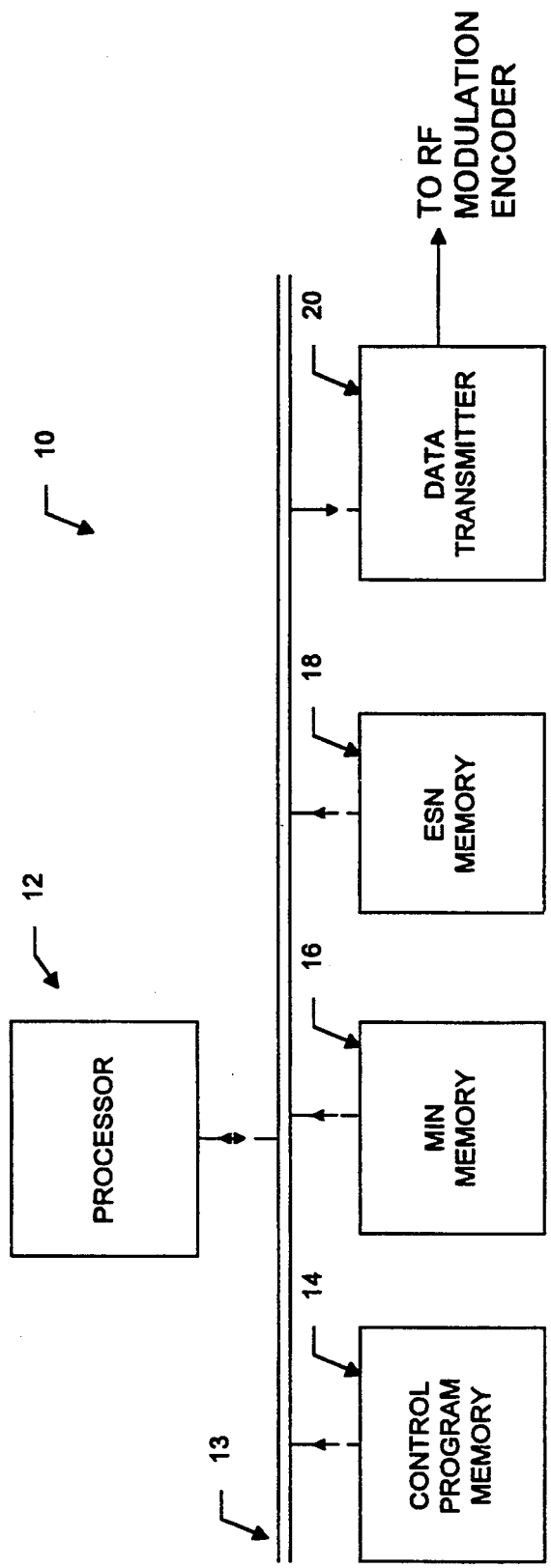
FIG. 1 is a block diagram of a conventional mobile telephone data transmission system.
Figure 2A:
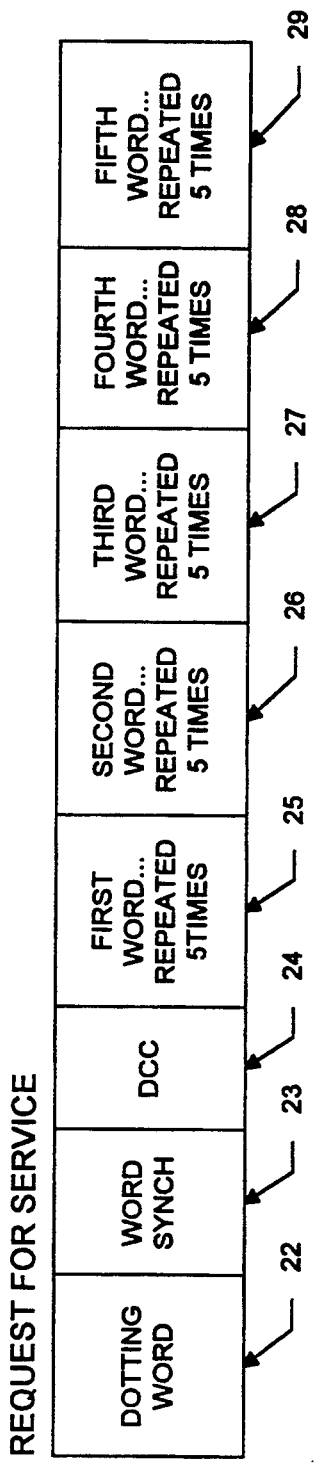
FIG. 2A depicts the format of a request for service.

FIG. 1 depicts a conventional data transmission system 10 for a mobile telephone. This system may be used to transmit to a base station requests for service, for example, call requests. The system 10 transmits the requests over a reverse-control-channel (RECC) reserved for such requests. The requests are sent in a multiple word format illustrated in FIG. 2A, although all words depicted in the drawing are not necessarily included in every request. The term "call request" used throughout the description applies to all types of service requests, such as, originations, page responses, and registrations.

Referring to both FIGS. 1 and 2, a processor 12 controls the overall operation of the data transmission system 10. When a call is to be made, the processor 12 retrieves from a control program memory 14 over a bus 13 a call origination program. The processor 12 then generates a call request 21 using information stored in both a MIN memory 16 and a one time programmable ESN memory 18. The processor 12 sends the generated call request 21 to a data transmitter 20, which encodes the request to include in it clock information and prepares the request for transmission to a base station (not shown). As the request 21 is being transmitted, it is encoded for RF modulation by an RF modulation encoder (not shown).

The processor 12 formulates, in accordance with system requirements, dotting and word synchronization words 22-23 which enable the base station receiving the transmitted request to synchronize to the transmission. It also includes in the request a DCC word 24 which identifies the transmission channel. The processor 12 formulates multiple copies of words 25-27, using the stored MIN and ESN to identify the call originating telephone, and words 28 and 29, using, in a call request, the number to be called to designate the called address. As discussed below, the word 26, which is an extended address word, is included in some but not all requests, depending on the operation protocol of the system. Similarly, word 27, which is a serial number word, is included in some but not all requests, depending on the configuration of the system.

Figure 2B:
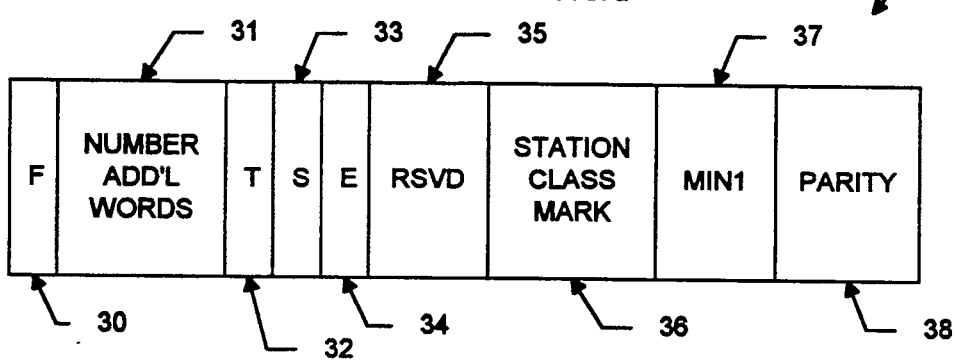
FIG. 2B depicts the format of a call request.
Figure 2B:
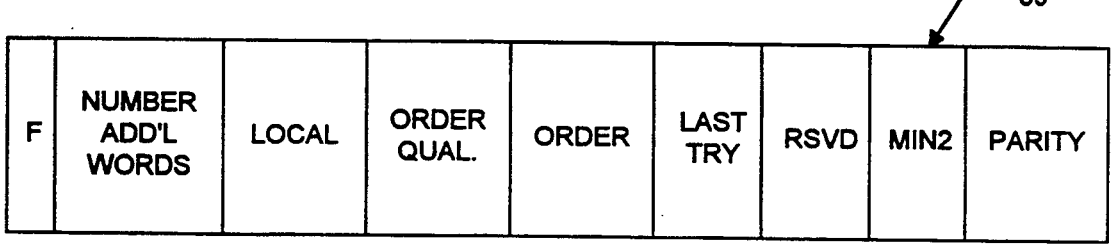
Figure 2B:
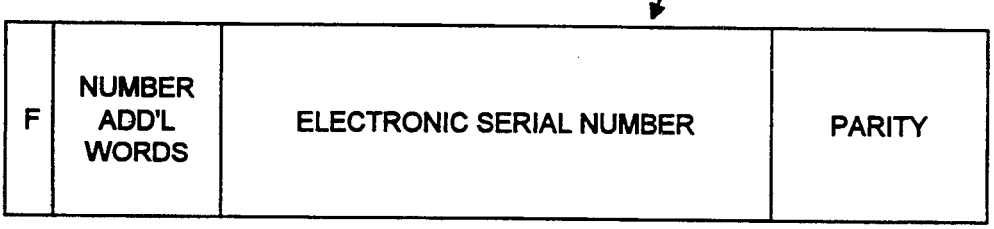
Figure 2B:
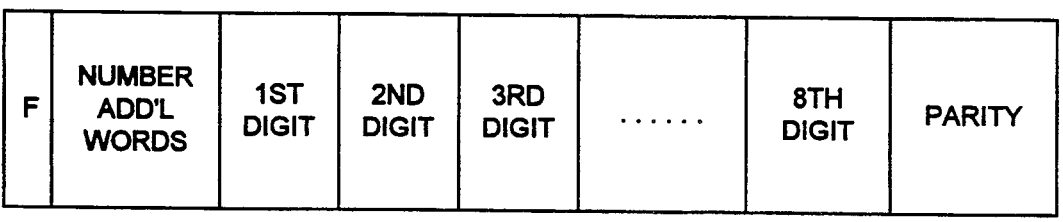
Figure 2B:
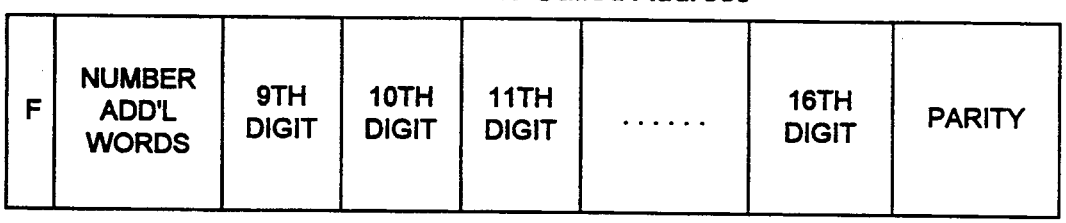

As shown in FIG. 2B, each word of the call request includes an "F" field 30 which is set to "1" in the first word and "0" in each of the other words, and a Number of Additional Words field 31 which contains an indication of the number of words to follow. Abbreviated address word 25 also includes a "T" field 32 which is set to a "1" to indicate that the message is a call request; an "S" field 33 which is set to a "1" to indicate that the serial number word is included in the message and set to "0" to indicate that the serial number word is not included in the message; an "E" field 34 which is set to "1" to indicate that an extended address word is included in the message and set to "0" to indicate that the extended address word is not included in the message; an RSVD field 35 which is reserved, or set to all 0's, but in the future may be used to send additional information; a Station Class Mark field 36 which is used to convey certain transmission operation information, namely, power class, transmission type, i.e., continuous or discontinuous, and bandwidth; a MIN1 field 37 which contains the last seven digits of the retrieved MIN encoded in accordance with a designated decimal-to-binary conversion code, and a Parity field 38 which contains redundancy bits generated by encoding the other fields in the word, using a designated error detection/correction code.

The extended address word 26 includes various fields which convey transmission operation information and access type, and a MIN2 field 39 which contains the first three digits of the MIN, that is, the area code digits, encoded in accordance with the decimal-to-binary conversion code. If the extended address word 26 is not included in a request, the access type is either an origination or a page response. Serial number word 27 includes an ESN field 40 which contains the retrieved ESN. Called address words 28 and 29 each contain various digits of the number to be called.

Referring again to FIG. 1, both the control program memory 14 and the MIN memory 16 may be altered after manufacture to accommodate updated or corrected information. If, for example, a caller is assigned a new MIN, the contents of the MIN memory 16 may be updated so that the new MIN is thereafter included in call requests. The ESN memory 18 may not be altered after manufacture. The ESN specifically and uniquely identifies the telephone, and thus, need not reflect changes in, for example, software control programs.

If a caller desires to make an unauthorized call, that is, a call charged to another telephone, the caller may change the stored MIN to the desired MIN and then change the stored control program to instruct the processor 12 to retrieve an ESN from a memory location other than ESN memory 18. The processor 12 generates the call request using the new MIN stored in the MIN memory 16 and the ESN stored in the memory location to which the processor is directed by the altered control program.

The processor 12 sends to the data transmitter 20 the generated call request, which is properly formulated with the altered MIN and ESN. The transmitter 20 adds clocking information to the request and sends it on to the RF modulation encoder and ultimately to the base station. If the base station recognizes the MIN/ESN pair in the call request, it processes the call for the transmitting telephone and bills the call to the telephone identified by the included MIN/ESN pair.

Figure 3:
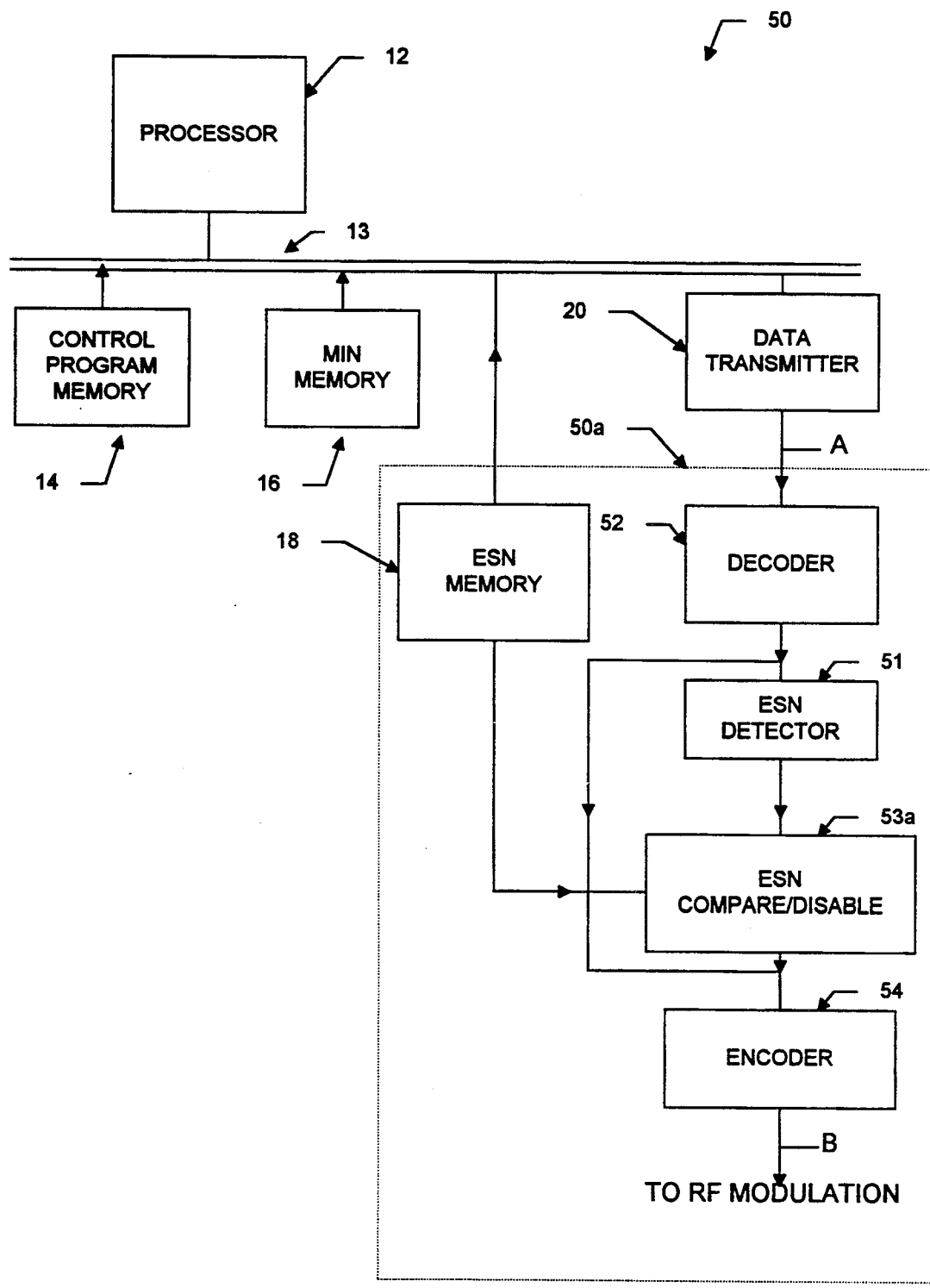
FIG. 3 is a block diagram of a mobile telephone data transmission system which includes ESN detection circuitry.

FIG. 3 depicts a data transmission system 50 which includes, in addition to the components of system 10, an ESN detection system 50a. The ESN detection system 50a, which consists of an ESN detector 51, a decoder 52, an ESN compare/disable circuit 53a and an encoder 54, is added to the transmission system 50 as a single component which also includes the ESN memory 18. To initiate a call, the processor 12 formulates a call request and transfers the call request to the data transmitter 20 as described with reference to FIG. 1 above. As the call request is being transmitted by the data transmitter 20, the decoder 52 removes from the request the clocking information added by the transmitter 20 and an ESN detector 51 examines the decoded request to determine the start of the word containing the ESN. The ESN detector 51 then locates the included ESN and essentially compares it with the ESN in ESN memory 18 to determine if the included ESN matches the stored ESN. If the two ESNs match, the encoder 54 re-encodes the request to again add to it clocking information and the request is transmitted. The operation of the ESN detector 51 and ESN compare/disable circuit 53a are discussed in more detail with reference to FIG. 4 below.

Figure 4:
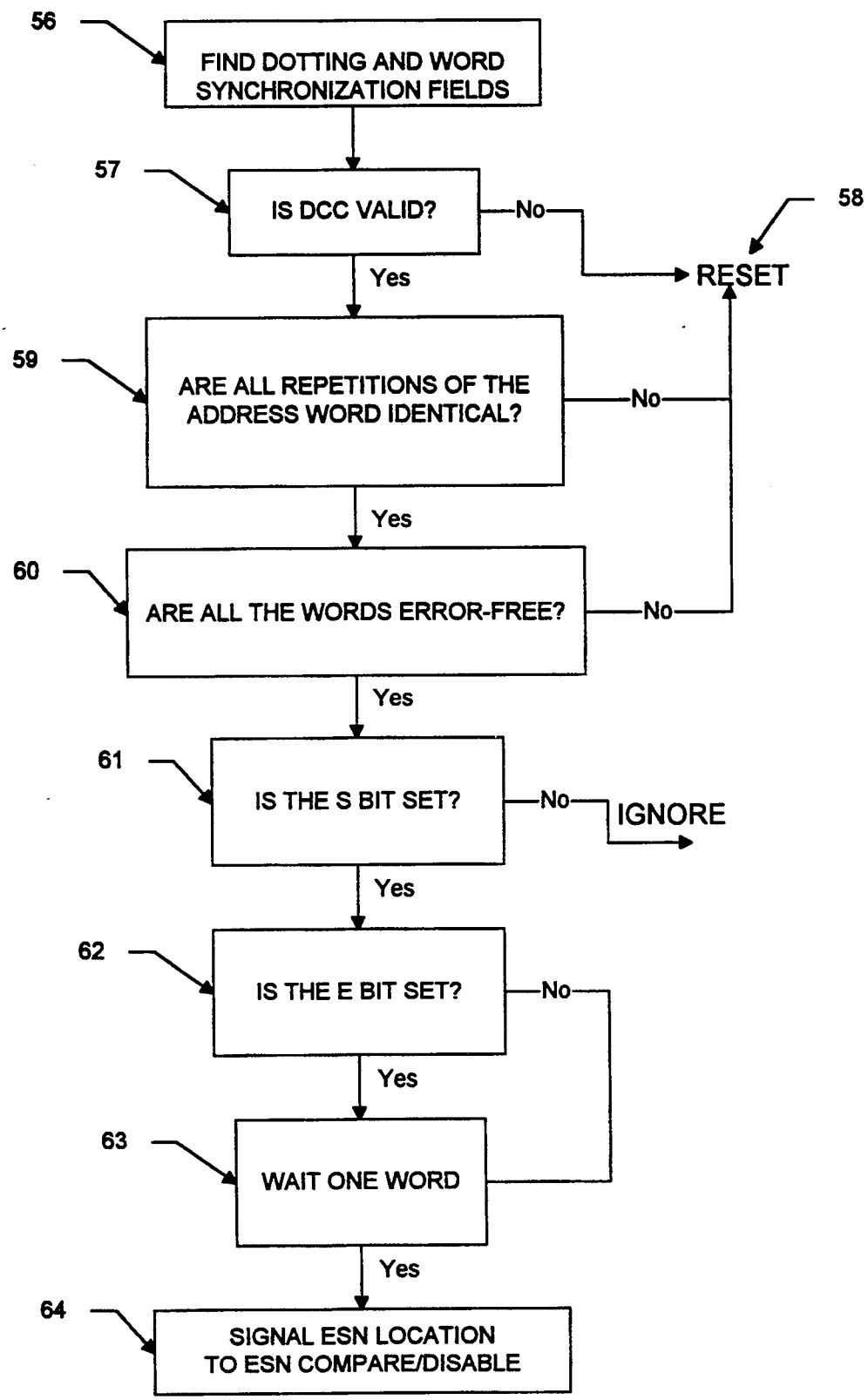
FIG. 4 is a flow chart of the operation of the ESN detection circuitry of FIG. 3.

The ESN detector 51 must not only detect the bit location of the ESN in an error-free call request, it must also recognize a corrupted call request, such as a request with one or more altered versions of a repeated word, to ensure that a corrupted request will not set-up an unauthorized call. Accordingly, as illustrated in FIG. 4, the ESN detector 51 looks first for dotting and word synchronization words 22-23 (step 56) to determine the beginning of a call request. Once the ESN detector 51 locates the beginning of a call request, it checks the DCC field 24 (FIG. 2A) to determine if the field contains a valid DCC (step 57). Next, it checks all repetitions of the abbreviated address word 25 (step 59), to determine if the copies are identical. If the copies are not identical or if the DCC is not valid, the ESN detector 51 terminates the transmission operation and resets the transmitter (step 58).

If all copies of the abbreviated address word 25 are identical, the detector checks the word for errors using the parity bits in the parity field 38 (step 60). If the parity bits indicate that the word contains one or more errors, the detector 51 terminates the transmission and resets the transmitter 20.

By terminating transmissions which contain one or more altered copies of an abbreviated address word 25, the detector 51 ensures that it will not be circumvented by, for example, a call request with an erroneously cleared S, or serial number, bit. Since a cleared S bit indicates that the request does not include an ESN, the ESN detector 51 does not check for a proper ESN in such a request. Thus, if an erroneously cleared S bit is not detected by parity error or word comparisons, a request which contains an altered ESN may be transmitted.

If the request is error-free, the detector examines the S bit to determine if the bit is set to indicate inclusion of the serial number word (step 61). If the S bit is set, the detector 51 examines the included E bit to determine if that bit, which indicates the inclusion of an extended address word, is set (step 62). If the E bit is set, the detector waits for the extended address word 26 to pass before it looks for the ESN in serial number word 27 (step 63). Otherwise, the detector looks for the ESN in the word immediately following the abbreviated address word 25.

Once the detector locates the ESN it enables an ESN compare circuit 53a (step 64). The ESN compare circuit compares the ESN in the request with the ESN stored in the ESN memory 18. If the ESN compare circuit 53a determines that the two numbers match, it allows the call request transmission to continue. If the ESN compare circuit 53a determines that the two numbers do not match, it cancels the call request transmission and resets the transmitter. The transmission system 50 thus fully transmits only those call requests which contain the appropriate ESN.

Figure 5:
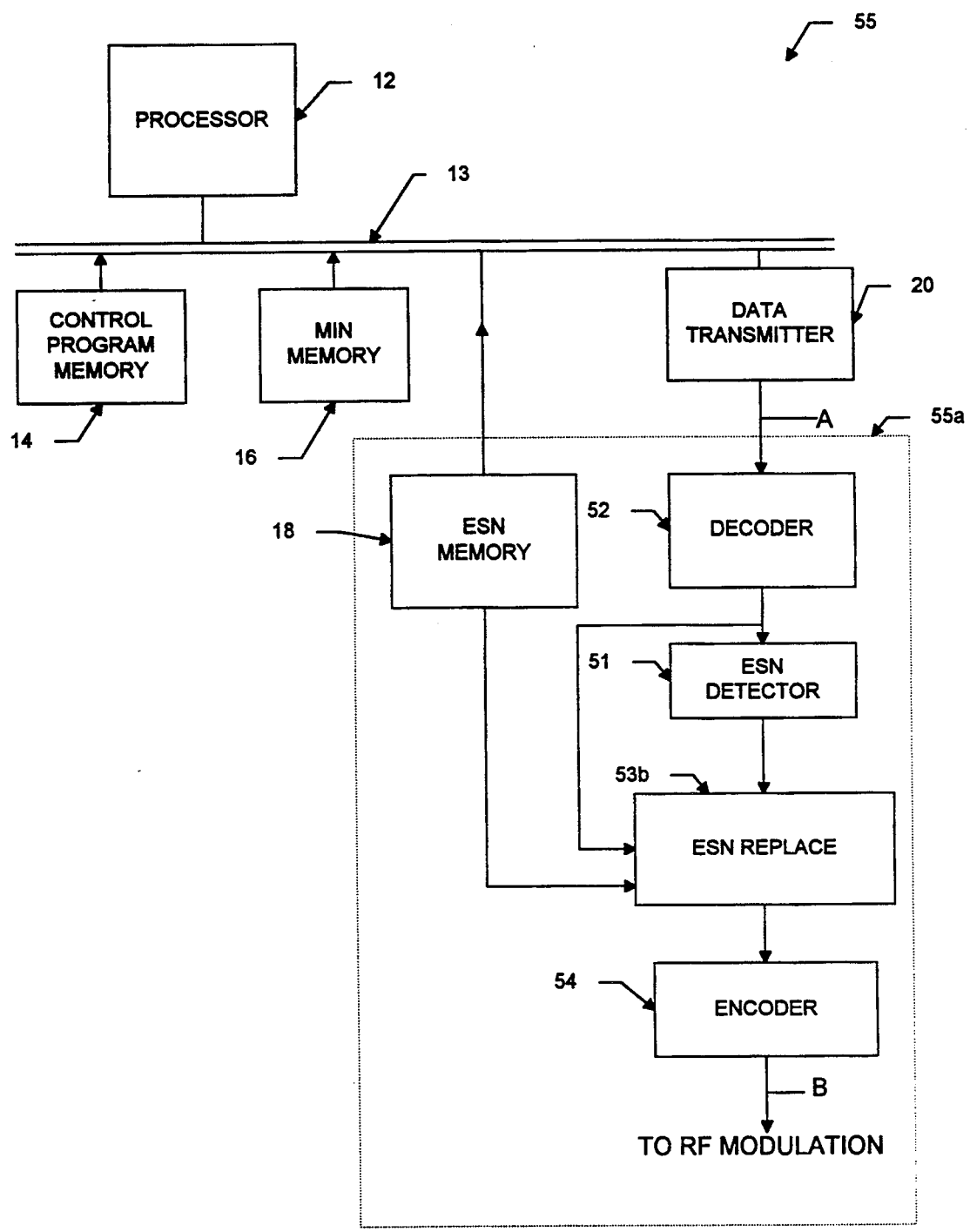
FIG. 5 is a block diagram of a mobile telephone data transmission system which depicts a variation of the ESN detection circuitry of FIG. 3.

FIG. 5 depicts a data transmission system 55 which includes, in addition to the components of FIG. 1 and the ESN detector 51, encoder 52 and decoder 54 of FIG. 3, an ESN replacement circuit 53b. As described above with reference to FIG. 3, the ESN detector 51 locates the ESN in a call request which has been decoded by decoder 54. The detector 51 then enables the ESN replacement circuit 53b, and the ESN replacement circuit 53b replaces the ESN in the call request with the ESN from the ESN memory 18. The encoder 52 then encodes the request for transmission. The ESN replacement circuit 53b does not examine the ESN in the call request to determine if the ESN is the proper one, it simply replaces the number with the ESN from the ESN memory 18, which automatically includes the proper ESN in the request.

Figure 6:
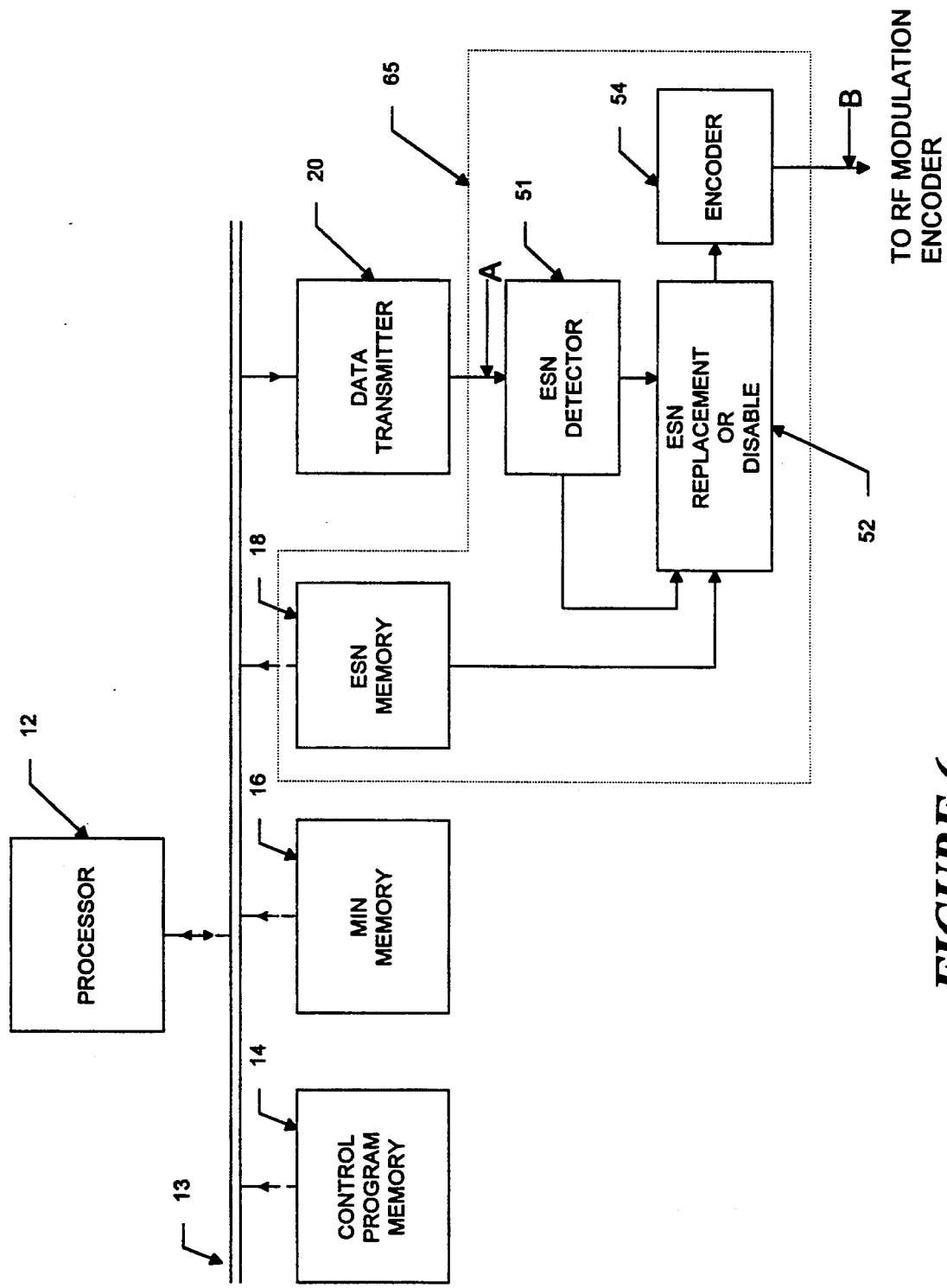
FIG. 6 is a block diagram of a mobile telephone data transmission system which depicts a variation of the ESN detection circuitry of FIGS. 3 and 5.

To prevent a caller from bypassing the ESN detector system by, for example, placing a jumper wire from point A to point B in either transmission system 55 (FIG. 5) or transmission system 50 (FIG. 3), an encoder, which is ordinarily included in the data transmitter 20 to encode clock information into the data, is either removed or disabled and decoder 52 is omitted from the circuit. The encoder 54 remains in the ESN detection system 65 to encode the request for transmission, as depicted in FIG. 6. If a caller attempts to bypass the ESN detection system 65, the caller must not only attach a jumper wire from points A to B, he must also attach an encoder, which makes the bypass connection more difficult.

The call requests are transmitted on a Reverse-Control-Channel (RECC). Other messages are transmitted on a Reverse-Voice-Channel (RVC). The format of the RVC transmission is different than the format of the RECC transmissions. For example, the RVC transmissions include between various words additional synchronization information.

Some telephones use the same data transmission system for both RECC and RVC transmissions. If the system ESN detector 51 cannot distinguish between the two formats it may mistakenly interpret a data pattern formatted for the RVC as a call request and look for an included ESN. The ESN detector and related circuitry may then either cancel the request, if the bits it presumes are the ESN do not match the stored ESN, or it may replace certain of the RVC message bits with the stored ESN, and thus, corrupt the message.

Figure 7:
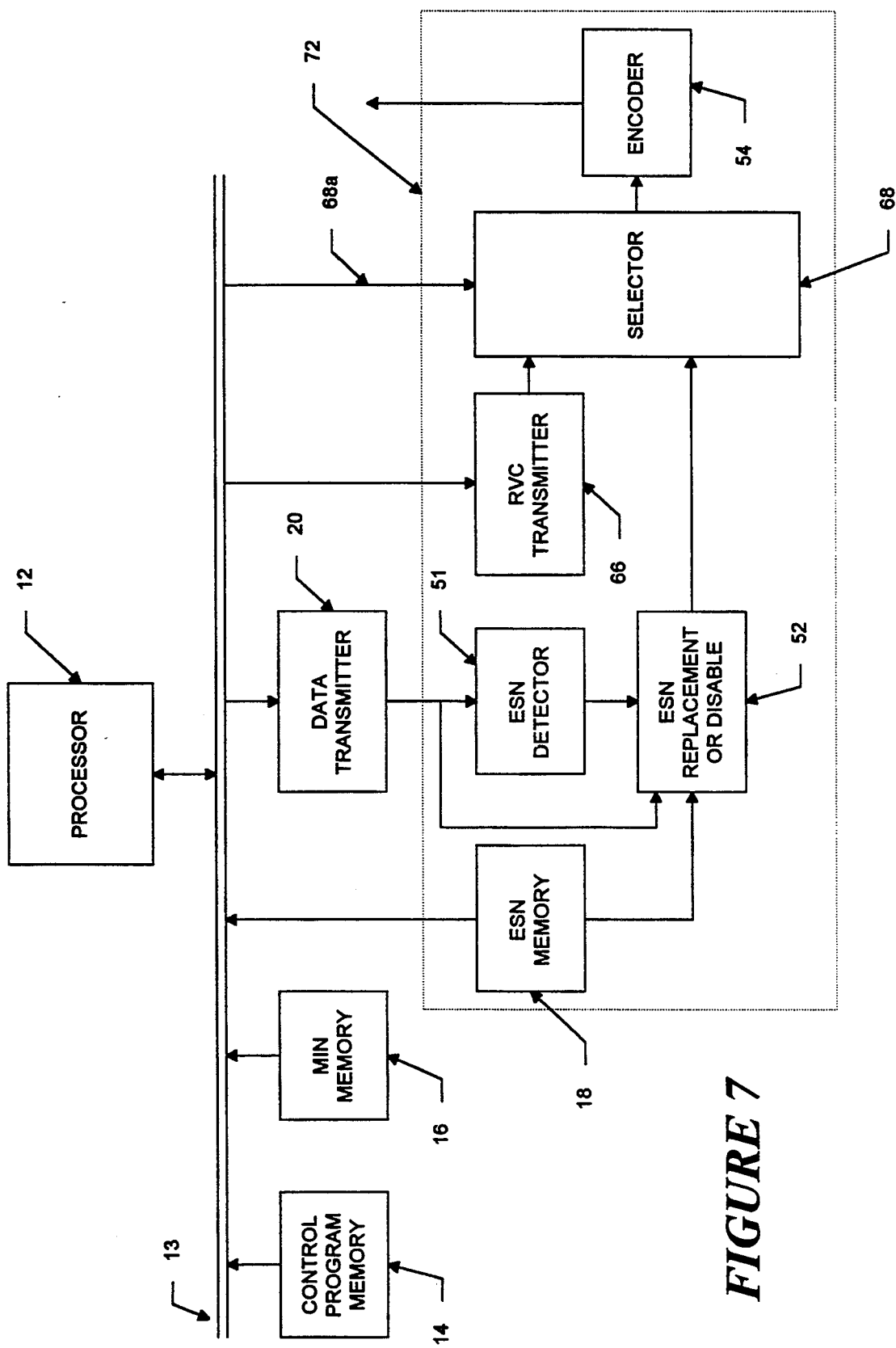
FIG. 7 is a block diagram of a mobile telephone data transmission system constructed in accordance with another embodiment of the invention.

To alleviate this problem, a separate RVC data transmitter 66 may be included in the data transmission system. Referring to FIG. 7, an RVC data transmitter 66, which includes message formatting circuitry, formats a message for RVC transmission. The processor 12 asserts an RVC mode control signal on line 68a, and in response, a selector 68 selects the signals from the RVC data transmitter for further encoding by encoder 54 and transmission. By selecting the signals from the RVC transmitter for further transmission, the selector 68 ensures that the transmitted message is formatted for transmission over the RVC, and not formatted for RECC transmission. It thus defeats a caller who changes the control program and uses the RVC transmitter to transmit call requests on the RECC in an attempt to circumvent the ESN detector 51.

In future systems ESN's may be included in RVC formatted messages. Accordingly, an ESN detector 51 which is designed to locate the ESN's in an RVC formatted message may be included in the RVC transmission circuitry.

The data transmission systems shown in FIGS. 3, and 5-7 are designed for use with existing mobile telephones. Thus these systems include all the components of existing data transmission systems, as depicted in FIG. 1, as well as ESN detectors 51 and various other add-on ESN compare or replacement circuits, all of which operate to ensure that the ESN transmitted as part of a call request is the ESN assigned to the telephone by the manufacturer.

The remaining embodiments replace the conventional data transmitters with a transmission system which is a combination controller and data transmitter that, in addition to transmitting the data, formats the request or message.

Figure 8:
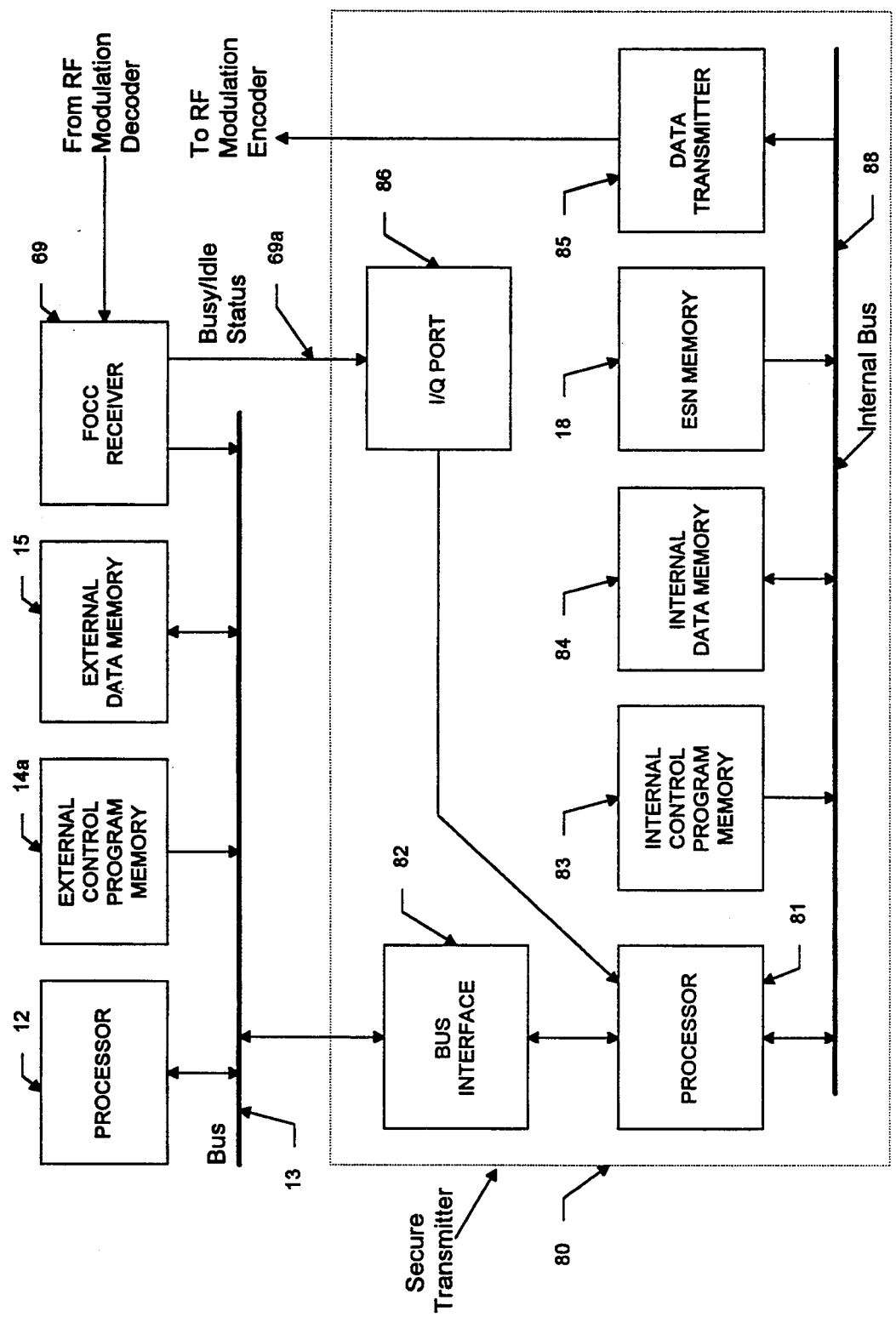
FIG. 8 is a block diagram of a mobile telephone data transmission system constructed in accordance with a further embodiment of the invention.

Referring now to FIG. 8, a transmitter 80, which is preferably implemented on a single application-specific-integrated circuit, or ASIC, performs message formatting, ESN insertion and data transmission functions in accordance with a control program stored in an internal control program memory 83, which is not field alterable. The advantage to this embodiment is that the transmission system may be redesigned by the manufacturer, relatively easily, in response to changes in standard specifications. The manufacturer would then replace the single ASIC with an updated ASIC. Previously discussed systems which include separate data transmitters for RECC data transmission and RVC data transmission, as well as ESN replacement or disable circuitry, would require rather extensive updating to accommodate changes to the standard specification.

Referring again to FIG. 8, the secure transmission system 80 includes a processor 81 which communicates with other devices included on the ASIC via internal bus 88, and with devices external to the ASIC via bus interface 82 and I/O port 86. Processor 81, which executes instructions stored in internal control program memory 83 and accesses data stored in external data memory 15, formats messages for transmission and stores the formatted messages in internal data memory 84. A data transmitter 85, under the control of processor 81, retrieves messages stored in internal data memory 84 and transmits them through an RF modulation encoder (not shown).

Processes which are not specifically involved in data formatting and transmission, such as automatic redial, or speed dialing, for example, are controlled by software stored in external control memory 14A. The memory 14A, unlike devices in the secure transmission system 80, can be updated to enhance existing features of, or add features to the telephone. The software that controls the formatting and transmitting of messages, which is stored in internal control program memory 83, is not alterable, and thus, the ASIC must be replaced to accommodate changes to message formats or transmission requirements. It is expected that changes to the message format and transmission requirements will be made infrequently, which means that the ASIC need not be redesigned or replaced often. However, it is expected that changes to "user friendly" features of the telephone, such as the speed dialing and redial features discussed above, will be made relatively frequently. Thus, since the software which controls these user friendly features can be easily updated by updating the external control program memory 14A, the telephone can be kept current without redesign or replacement of the ASIC.

To initiate a transmission operation, processor 12, which is executing instructions from external control program memory 14A, prepares a message for transmission and stores it in external data memory 15. These messages do not contain word synchronization, ESN, data repeats or parity information, which is later supplied by devices included in the transmission system 80. Processor 81, now executing instructions from internal control program memory 83, passes the information stored in external data memory 15 to internal data memory 84 via bus interface 82. Processor 81 also receives, from processor 12, a signal which represents the transmission mode, that is, RECC with or without busy/idle monitor or RVC, from processor 12.

Processor 81 formats the message which is now stored in internal data memory 84 in accordance with the transmission mode signal received from processor 12. The processor 81 thus adds word synchronization, DCC (if RECC mode), generates data repeats, inserts the ESN from ESN memory 18 (as indicated by the included S and E bits), and as parity information. The processor then sends the formatted message to data transmitter 85 for transmission. At the completion of transmission processor 81 sends to processor 12, via bus interface 82, a signal representing the completion status of the transmission. Processor 12 may then initiate a next transmission, as necessary.

If required during RECC transmission, processor 81 monitors the busy/idle status signal received from FOCC data receiver 69, which is a component which is external to the transmission system 80. If this signal, which is supplied to the processor through I/O port 86, is a busy signal it indicates that the transmission channel is busy and/or that a transmission has collided with a transmission from another telephone. Accordingly, the transmitter either refrains from starting a transmission or stops a transmission which is under way.

The transmission system 80 need not determine that the formatted message is error-free and/or that the repetitions of the various words are identical, as discussed with reference to FIGS. 3 and 4 above. Instead, because the ESN memory 18 is included in the ASIC, the system need only check the S and E bits to determine when and where to insert the ESN in an RECC message. Other implementations using custom hardware logic are possible.

Figure 9:
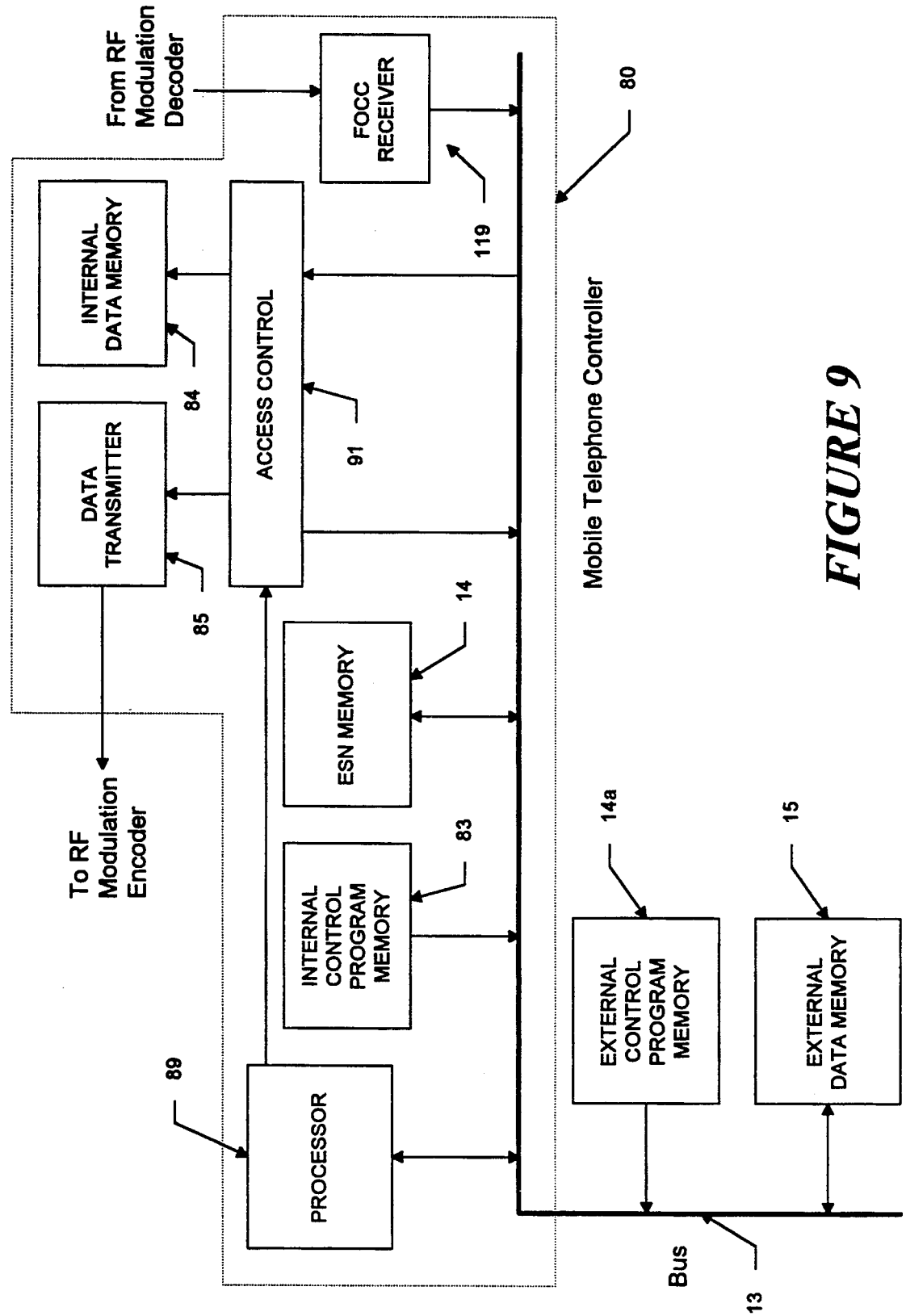
FIG. 9 is a block diagram of a mobile telephone data transmission system constructed in accordance with a preferred embodiment of the invention.

A preferred embodiment of a transmission system is depicted in FIG. 9. The processor 12 and processor 81 of FIG. 8 are combined to form a processor 89 which controls all of the operations of the mobile telephone. This processor is included in the transmission system 90, and thus it is integrated into the ASIC. The FOCC receiver 69 is also included in the ASIC, which eliminates the need for the busy/idle status line 69a of FIG. 8. The prime advantage of this embodiment is that the transmission system may not be bypassed since it is integrated with the processor which essentially controls the telephone. Also, there is a cost advantage in the use of a single processor 89 rather than the two processors 12 and 81.

The transmission system 90 connects directly to the system bus 13. Thus an access control circuit 91 is used to control access to internal data memory 84 and data transmitter 85. Processor 89 enables the access control circuit 91 only when it is executing instructions received from internal control program memory 83.

To initiate a transmission operation, the processor 89, under the control of a control program stored in external control memory 14A, retrieves information stored in external data memory 15, which includes the message contents and information such as transmission type, that is, RECC, RVC, or busy/idle monitor, and other message-related parameters. The processor 89, now operating under the control of a control program stored in internal control program memory 83 formats the message by adding word synchronization and data repeats, inserting the ESN as indicated by the S and E bits included in the message and adding parity. The processor 89 then enables access control circuit 91, and sends the formatted message to internal data memory 84. Since the access control circuit 91 permits access to internal data memory 84 only when processor 89 is executing instructions from the internal control program memory 83, it prevents alteration of the formatted message.

Processor 89 next sends, through access control circuit 91, transmission initiation instructions to data transmitter 85. If necessary, the processor 89 also monitors the busy/idle status provided by internal FOCC receiver 69. When transmission is complete, the processor 89 again looks to external control program memory 14A for instructions, until a next transmission is initiated.

The foregoing description has been limited to several specific embodiments of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A data transmitting system for use with a mobile telephone which is assigned an electronic serial number, the system including:
   A. a processor for formatting a message for transmission, the processor including in the message an electronic serial number;
   B. a data transmitter for transmitting the message;
   C. an electronic serial number detector for determining the location of the electronic serial number in the message;
   D. comparing means for comparing the electronic serial number in the message with the electronic serial number assigned to the telephone; and
   E. means for disabling the data transmitting system if the comparing means determines that the electronic serial number in the message does not match the electronic serial number assigned to the telephone.

2. The data transmitting system of claim 1, wherein the system further includes an encoder for encoding the message as the message is being transmitted to include in the message clock information.

3. A data transmitting system for use with a mobile telephone which is assigned an electronic serial number, the system including:
   A. a one-time programmable electronic serial number memory for storing the electronic serial number memory;
   B. a processor for formatting a message for transmission, the processor including in the message the electronic serial number from the electronic serial number memory;
   C. a data transmitter for transmitting the message;
   D. an electronic serial number detector for determining the location of the electronic serial number in the message; and
   E. means for replacing the electronic serial number in the message with the electronic serial number in the electronic serial number memory.

4. The data transmitting system of claim 3, wherein the system further includes an encoder for encoding the message as the message is being transmitted to include in the message clock information.

5. A data transmitter for a mobile telephone, the data transmitter including:
   A. an electronic serial number memory for storing an electronic serial number assigned to the mobile telephone;
   B. a message memory for storing a message and message related information;
   C. means for retrieving the message and message related information from the message memory;
   D. means for retrieving the electronic serial number from the electronic serial number memory;
   E. formatting and encoding means for (i) formatting the message and including in the message the electronic serial number retrieved from the electronic serial number memory and (ii) encoding the message for transmission;
   F. means for transmitting the encoded message.

6. A data transmitting system for use with a mobile telephone, the system including:
   A. a controller for receiving message information and formatting the message information for transmission;
   B. a one-time programmable electronic serial number memory which is accessible under the control of the controller;
   C. the controller formatting the message for transmission and including in the formatted message the electronic serial number from the electronic serial number memory;
   D. a data memory which is accessible under the control of the controller for storing the formatted message;
   E. a data transmitter operating under the control of the controller for retrieving the formatted message from the memory and encoding and transmitting the formatted message.

7. A method of operating a mobile telephone, the method including the steps of:
   A. formulating a service request which includes an electronic serial number;
   B. transmitting the service request;
   C. examining the request as it is being transmitted and determining the bit-position of the electronic serial number;
   D. comparing the electronic serial number in the request with an electronic serial number assigned to the telephone at manufacture;
   E. if the serial numbers are the same continuing to transmit the request; and
   F. if the serial numbers are not the same ending the transmission.

8. The method of claim 7, wherein the method further includes:
   i. in the step of examining the request as it is being transmitted, decoding the request to remove clocking information before examining the request; and
   ii. in the step of continuing the transmission, encoding the request to add clocking information.

9. A method of operating a mobile telephone comprising the steps of:
   A. formulating a service request which includes an electronic serial number;
   B. transmitting the service request;
   C. examining the request as it is being transmitted and determining the bit-position of the electronic serial number;
   D. eliminating the electronic serial number in the request and inserting in the request an electronic serial number assigned to the telephone at manufacture.

10. The method of claim 9, wherein the method further includes:
    i. in the step of examining the request as it is being transmitted, decoding the request to remove clocking information before examining the request; and
    ii. in the step of continuing the transmission, encoding the request to add clocking information.

* * * * *